Sept. 8, 1931.  A. S. HUBBARD  1,822,811
CURRENT CONVERTING SYSTEM
Filed March 31, 1928
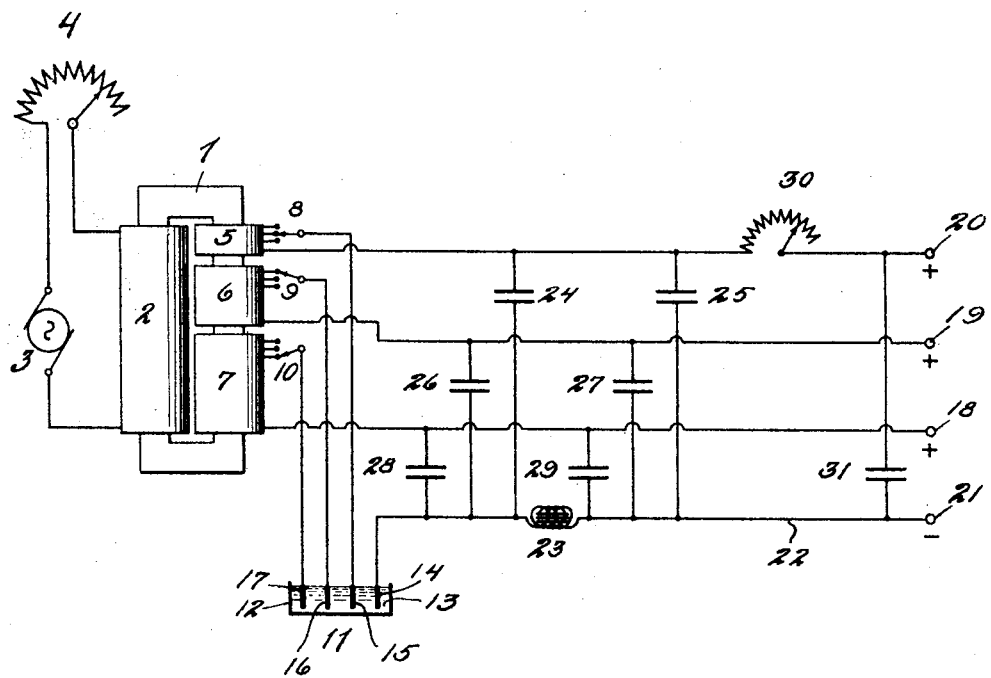
Inventor
Albert S. Hubbard
By
his Attorney Patented Sept. 8, 1931

1,822,811

UNITED STATES PATENT OFFICE

ALBERT S. HUBBARD, OF BETHEL, CONNECTICUT, ASSIGNOR, BY MESNE ASSIGNMENTS, TO GOULD STORAGE BATTERY CORPORATION, OF DEPEW, NEW YORK, A CORPORATION OF DELAWARE

CURRENT CONVERTING SYSTEM

Application filed March 31, 1928. Serial No. 266,243.

The invention relates to electrical power supply apparatus and has particular reference to a means for and method of converting alternating into direct current and obtaining, from the single source, direct currents of different selected voltages suitable for the operation or energization of desired apparatus.

More specifically, the object of the invention is to provide a means for and method of obtaining direct currents of different desired voltages suitable for use in energizing a radio apparatus or set without the employment of storage batteries or B batteries, the power being derived from the usual alternating current provided in connection with house lighting systems.

An important object of the invention is to provide a single unit acting as means to rectify currents of different voltages instead of employing a plurality of individual rectifiers of one type or another for the respective currents, there being possibly no limitation as to the specific character of the rectifier itself, though preferably the rectifier may consist of one of the electrolytic type with one electrode connected with the common feed or return and the others connected in the circuits of the currents of the different voltages.

Another object of the invention is to provide a filter system in connection with the output current whereby the characteristic ripple in rectified currents will be smoothed out or eliminated so as to render the currents suitable for use in the energization of radio apparatus.

An additional object is to provide an apparatus of this character which will be simple and inexpensive to construct or assemble, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

The figure is a diagram showing the complete circuit arrangement.

Referring more particularly to the drawing, the numeral 1 designates the core of a transformer having a primary coil 2 supplied with alternating current of suitable voltage from a source 3, regulation being effected by a rheostat 4. The transformer also includes a plurality of secondary coils 5, 6 and 7, only three being shown in the present case as it is desired to obtain only three output circuits of different voltages, it being, however, readily apparent that there may be any desired number of secondary coils, of course within reasonable limits. The secondary coils 5, 6 and 7 are wound to produce (when its output has been rectified) the desired direct current voltage. It is probably preferable that the secondary windings be tapped as illustrated and minor variations in the output obtained by including more or less turns in the individual circuits, such changes in number of turns being accomplished through the medium of switches 8, 9 and 10.

In conjunction with the transformer use is made of a rectifier 11 which is preferably and which is here illustrated as being of the electrolytic type including a container 12 within which is a suitable electrolyte 13 in which are immersed an iron electrode 14 and a plurality of aluminum electrodes 15, 16 and 17 corresponding in number to the number of secondary coils of the transformer. It is, however, conceivable that use might be made of some other electro-chemical rectifier of the wet or dry type or even one of the gaseous tube type though excellent results are obtainable by the device shown and described. The respective secondary coils 5, 6 and 7 have one terminal connected with the electrodes 15, 16 and 17, the exact connection being represented as through the switches 8, 9 and 10. The other terminals of the secondary coils are brought to suitable binding posts or the like 18, 19 and 20, respectively. If the apparatus is designed to be used in connection with radio receiving apparatus or sets, these binding posts 18, 19 and 20 may be or are adapted to be connected with the audio frequency amplifier, radio frequency amplifier and detector unit current supply terminals. The return 21 is through a conductor 22 to the iron, or equivalent, electrode 14, the current flowing from the iron electrode to the aluminum electrode in the rectifier but neither vice versa nor from one aluminum electrode to the other.

The current in the three output circuits is filtered for use in connection with a radio set so as to eliminate the ripple and resultant "hum" caused by the pulsations in the rectified current. In the present instance I have found it satisfactory to make use of a single choke coil 23 of proper value interposed in the conductor 22 which constitutes the return. Locating the choke at this point is equivalent to providing three seperate ones in the feed conductors. The choke 23 is preceded and followed by condensers of the proper capacity connected, 24 and 25 to the detector supply, 26 and 27 to the radio frequency supply or circuit, and 28 and 29 to the audio frequency supply. The detector voltage may be adjusted by means of an ordinary or preferred rheostat 30. It has been found preferable to provide an additional condenser 31 shunted across the detector supply and the return. Clearly the capacity of the different condensers must be properly balanced and should bear a certain relation to the value of the choke coil in order to obtain the best results.

From the foregoing description and a study of the drawing it will be apparent that I have thus provided an extremely simple arrangement whereby alternating current may be converted into direct currents of different desired voltages all obtainable through or by means of a single rectifier. The amount of apparatus necessary to accomplish the desired result has been greatly decreased as compared with the usual practice and unusual simplicity has been consequently attained. It is believed that the combination and arrangement as well as the operation will be readily apparent from the foregoing to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a current converting system, means for transforming a single alternating current into a plurality of separate alternating current circuits, means for varying the voltage of said plurality of alternating currents, and a single means for rectifying all of said plurality of currents simultaneously.

2. In a current converting system, a transformer having a primary coil energized by an alternating current and having a plurality of secondary coils designed to produce different voltages, one terminal of each secondary coil being connected in an output circuit, a single rectifier having a plurality of similar electrodes connected respectively with the other terminals of said secondary coils, said rectifier further including a single dissimilar electrode constituting the return for all of said output circuits.

3. In a current converting system, a transformer having a primary coil energized by an alternating current and having a plurality of secondary coils designed to produce different voltages, one terminal of each secondary coil being connected in an output circuit, a single rectifier having a plurality of similar electrodes connected respectively with the other terminals of said secondary coils, said rectifier further including a single dissimilar electrode constituting the return for all of said output circuits, and means for varying the voltage in the individual output circuits.

In testimony whereof I affix my signature.

ALBERT S. HUBBARD.